United States Patent

Chapnik et al.

[11] Patent Number: 6,014,202
[45] Date of Patent: Jan. 11, 2000

[54] OPTICAL SYSTEM FOR TRANSMITTING A GRAPHICAL IMAGE

[75] Inventors: Philip D. Chapnik, Newton; Bruce K. Johnson, North Andover; Richard G. Egan, Dover; Joseph DelPico, Brockton, all of Mass.

[73] Assignee: Polaroid Corporation, Cambridge, Mass.

[21] Appl. No.: 08/931,571

[22] Filed: Sep. 16, 1997

[51] Int. Cl.[7] .............................. G03B 27/54; G03B 27/52
[52] U.S. Cl. ................................... 355/67; 355/55
[58] Field of Search ................................ 355/55, 53, 67, 355/77; 359/206, 208; 349/1, 67; 340/701

[56] References Cited

U.S. PATENT DOCUMENTS

| | | | |
|---|---|---|---|
| 4,072,413 | 2/1978 | Ames | 355/3 |
| 4,805,012 | 2/1989 | Agostinelli et al. | 358/75 |
| 4,806,989 | 2/1989 | Saito et al. | 355/55 |
| 4,984,035 | 6/1991 | Kanzawa et al. | 357/17 |
| 4,998,118 | 3/1991 | Ng | 346/107 |
| 5,016,027 | 5/1991 | Uebbing | 346/107 |
| 5,504,514 | 4/1996 | Nelson | 347/130 |
| 5,594,526 | 1/1997 | Mori et al. | 355/67 |
| 5,640,284 | 6/1997 | Tanitsu et al. | 359/869 |
| 5,677,754 | 10/1997 | Machinouchi | 355/53 |
| 5,694,236 | 12/1997 | Sekikawa | 359/206 |
| 5,712,698 | 1/1998 | Poschenrieder | 355/71 |
| 5,790,275 | 8/1998 | Iizuka | 358/474 |
| 5,798,823 | 8/1998 | Kudo | 355/67 |
| 5,864,390 | 1/1999 | Johnson et al. | 355/67 |

FOREIGN PATENT DOCUMENTS

| | | |
|---|---|---|
| 62 169 181 | 7/1987 | Japan . |
| 63 185 659 | 8/1988 | Japan . |
| 03 288 122 | 12/1991 | Japan . |
| 05 008 445 | 1/1993 | Japan . |
| 07 108 709 | 4/1995 | Japan . |
| 07 301 868 | 11/1995 | Japan . |
| 07 306 481 | 11/1995 | Japan . |
| 08 001 998 | 1/1996 | Japan . |
| 09 186 367 | 7/1997 | Japan . |
| WO 9809190 | 3/1998 | WIPO . |
| WO 9835835 | 8/1998 | WIPO . |

OTHER PUBLICATIONS

PCT International Search Report for PCT/US 98/ 19308, Form PCT/ISA/210 and PCT/ISA/220.

*Primary Examiner*—Safet Metjahic
*Assistant Examiner*—Hung Henry Nguyen
*Attorney, Agent, or Firm*—Barry Gaiman; Donald F. Moffard; Joseph Stecewycz

[57] ABSTRACT

An optical system is disclosed wherein an illumination device is used to project colored light into a lens and focus through a spatial light modulator onto a photosensitive medium wherein the illumination device is configured so as to produce a uniform light distribution through the use of an aperture stop, a symmetrical placement of solid state light sources such as LEDs, or by LEDs fabricated such that the top surface emitting the colored light is not obstructed by an electrode or contacts connecting the light-emitting diode to a current source. Such a configuration is accomplished by providing a substantially transparent attachment layer that may include an opaque conductive material, but preferably includes transparent conductive particles that, in combination, attach and electrically connect the LED to a first electrode disposed upon a substrate. The light source is configured and spaced so as to allow incorporation of the light source into a print head, such that the print head can expose a photosensitive medium and focus down to produce a relatively uniform strip of light. The print head remains in relative motion with the photosensitive medium and allows for a delayed printing of some of the color information of each uniform strip of light. The spacing employed in the lighting device separating light-emitting diodes is as precisely defined so as to ensure overlay of each of the colors red, green and blue on each line of the photosensitive medium.

18 Claims, 10 Drawing Sheets

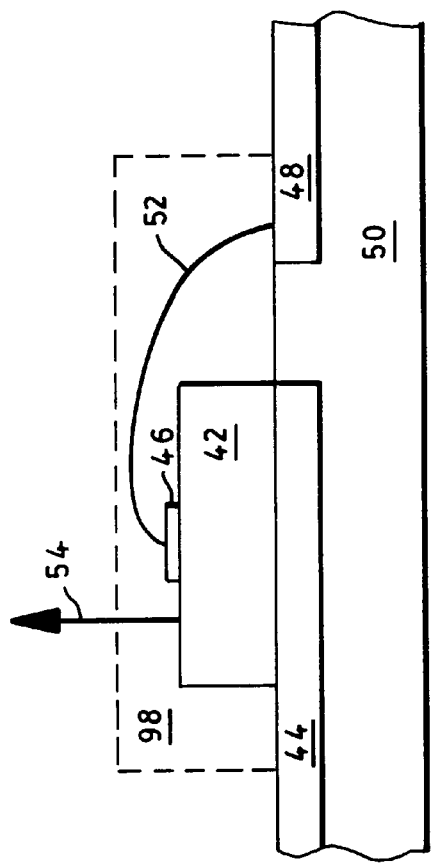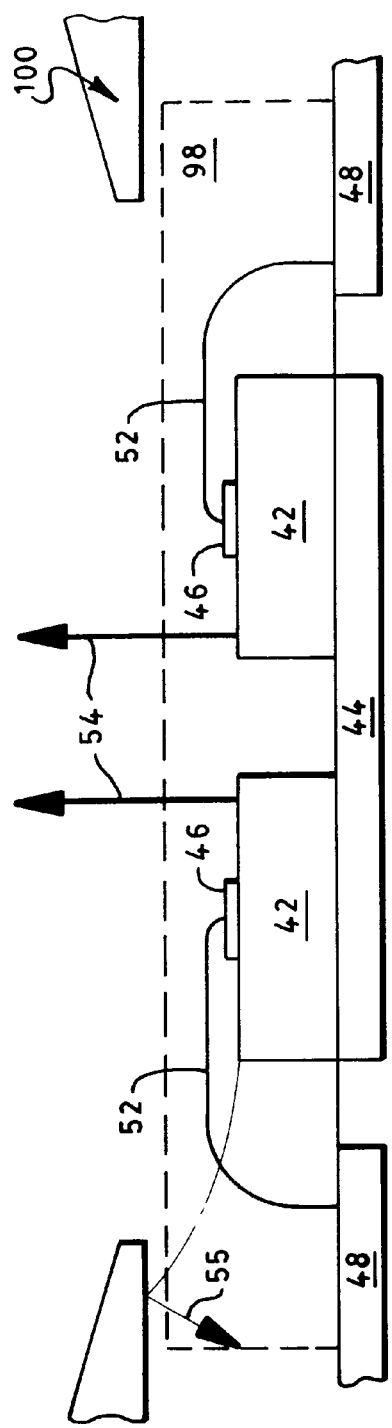

OPTICAL SYSTEM FOR TRANSMITTING A GRAPHICAL IMAGE

BACKGROUND OF THE INVENTION

1. Field of the Invention

This invention relates to an optical system that prints electronic images, such as may be used in an electronic photographic printer, and more particularly, to an optical system adapted to project light of a uniform illumination onto a photosensitive medium and adapted to transmit the graphical image with minimal registration problems.

2. Description of the Prior Art

There are numerous types of optical systems utilized in photographic printers. One such optical system is described in FIG. 1A, and is further described in commonly-assigned Patent Application, now U.S. Pat. No. 5,864,390 issued Jan. 26, 1999. In this optical system, a small source 10 projects emitted light 14 towards a parabolic mirror 12 that substantially collimates and reflects the colored light to a cylindrical lens 16. The cylindrical lens 16 causes the reflected light 15 to converge along a y-axis passing through a spatial light modulator 17 and forming a print line on a photosensitive medium 20.

One drawback of the one prior art optical system is an less than satisfactory image owing to the illumination drop-off of the image bearing light. The drop-off is due to the different path lengths the light must travel from small source 10 to photosensitive medium 20. It can be seen that emitted light 14 has a path length $L_1$ along a central axis of the optical system and a second path length $L_2$ at the farthest edge of parabolic mirror 12. Hence the distance to parabolic mirror 12 along the parabola varies relative to the small source 10. Therefore, since the closest point from the parabola is along a central axis A-A' and the farthest point from the parabola is along the edge of parabolic mirror 12, an illumination drop-off of emitted light 14 traveling along length $L_2$ is greater than that of emitted light 14 that travels the length $L_1$. This drop-off can be seen in FIG. 1B where a graph of light irradiance 22 with respect to the photosensitive medium 20 is shown by a curve 60.

While replacement of parabolic mirror 12 with a spherical mirror decreases the light drop-off problem as described in the aforementioned commonly assigned patent application, if the light source 10 is an area source, is to both the difference in path length and cosine fall-off, such as in the case of an LED light source, the optical system will exhibit a light drop-off due to cosine fall-off. Cosine fall-off exists because of the finite nature of an area light source as opposed to a point source. As the area light source has planar emitting dimensions, the angle of the emitted light 14 emitted from the area source varies along the mirror. The cosine fall-off in a system having a spherical mirror as opposed to a parabolic mirror is illustrated as graph 64 on FIG. 1B. Both graph 60 and graph 64 are less than a uniform illumination distribution of graph 66.

Further, if the light source 10 comprises standard light-emitting diodes (LEDs), the optical system will still have light irradiance problems owing to a structure of the LEDs as more fully shown on prior art FIG. 2A. An LED 42 is a semiconductor two-terminal solid-state device characterized primarily by its ability to pass current readily only in one direction.

The LED 42 is manufactured with a pad 46 deposited upon a top surface of the LED 42. The pad 46 is configured so as to create substantially uniform flow of electricity throughout the LED 42. The pad 46, however, blocks the light 54 emitted from a portion of the top surface of the LED 42.

When the LED 40 is used as the light source, as is shown in FIG. 1C, where like numerals designate like elements, the presence of the pad 46 alters the illumination distribution in the y-plane. The altered illumination distribution emitted by the LED 40 at the image plane B-B' is shown in FIG. 1D, which illustrates that the irradiance is decreased where the pad 46 obstructs the emitted light 54.

Turning now to FIG. 2A, a further drawback of using an LED light source is that a bonding wire 52 that connects the pad 46 to a substrate electrode 48 alters the transmission of the emitted light 54 from a portion of the top surface of the LED 42. Particularly, the emitted light 54 that is obstructed by the bonding wire 52 will have an altered angular light distribution as is shown in FIG. 2B by a curve 62 plotted as a graph of light emittanceon the abscissa versus function of angle θ across the surface of the LED 40, as the bonding wire 52 creates a strong shadow and a non-symmetrical, angular light-emission characteristic. Another drawback of using LEDs as a light source is that the bonding wire 52 is often coated with a passivation layer 56 that non-uniformity affects the emitted light 54. This is primarily owing to the tendency of the passivation layer 56 to clump at places along the bonding wire 52.

Further, LEDs that are edge emitters have a different angular light emission characteristic and contribute to a non-uniform illumination distribution in most optical systems in which they are incorporated.

Optical printers that utilize LEDs and lenses have another drawback in that they are often expensive. These printers usually project image-bearing light to an oscillating mirror, which directs the image-bearing light in a "fast-scan" direction. Motion of the photosensitive medium perpendicular to the oscillating mirror oscillation direction is used for the "slow-scan" direction. Each color of image-bearing light must be focused upon the photosensitive medium to form an acceptable image. Owing to the relative motion of the photosensitive medium in the "slow-scan" direction, however, expensive optical systems must be utilized to ensure exact registration of each color of an imaged line on the photosensitive medium.

Further, as exact registration is often assured by repositioning the optics or the photosensitive medium after each color of each line is imaged, there is sometimes a stopping and starting motion between the photosensitive medium and a print head containing the optics, thus the speed at which the optical printer can reproduce the image is decreased.

Accordingly it is an object of this invention to provide for an optical system that minimizes light drop-off from center to edge of the image.

It is a further object of this invention to provide an inexpensive optical system for a photographic printer.

It is still another object of invention to produce an optical system such that an image can be transferred to a photosensitive medium with minimal registration problems.

It is still a further object of invention to produce an optical system such that an image can be transferred to a photosensitive medium without mechanically stopping and starting.

SUMMARY OF THE INVENTION

The aforementioned problems are overcome and other advantages are provided by the invention which provides an optical system for use in a photographic printer that compensates for illumination variations of a light source and reproduces an image while maintaining relative motion between a photosensitive medium and a print head that includes the optical system. One such optical system includes a light source, a mirror, an aperture stop and a cylindrical lens.

The light source projects a beam of colored light upon the mirror, which is in optical alignment such that the beam is reflected towards the lens, and focused upon a photosensitive medium. Disposed within the beam is the aperture stop. Portions of the aperture stop define an aperture. As such, the aperture stop allows only selected portions of the colored light, that are incident upon the aperture, to be transmitted to the lens through the aperture and form part of the image while obstructing other portions of the colored light.

The portions of the aperture stop defining the aperture are curves functionally or intrinsically configured so as to negate portions of any inherent illumination distribution of the beam of projected light incident upon the aperture stop. In this way, the aperture stop can compensate for any variations in the beam of projected light, whether the variations are owing to the path length of projected light, a structure of the light source, or variations caused by inherent aspects of the optical system or print medium. Thus, the radiation impinging upon the photosensitive medium through the aperture has a pre-selected illumination distribution whether the pre-selected illumination distribution is uniform or non-uniform.

In a second embodiment of the invention a plurality of light-emitting diodes (LED) are used as the light source. Additional alterations of the illumination distribution of the projected beam owing to a configuration of the LEDs is minimized by disposing pairs of LEDs about a central axis of the light source, such that the pair of LEDs emit radiation having a symmetrical illumination distribution.

Another embodiment of the optical system uses the plurality of LEDs as the light source in conjunction with a spatial light modulator. The spatial light modulator oscillates between light transmissive and light blocking states and acts to modulate the incident light such that the portions of the image are reproduced on the photosensitive medium.

In one embodiment, the optical system reproduces the image upon the photosensitive medium using a constant relative motion between the photosensitive medium and a print head. The print head houses at least a portion of the optical system. The spatial light modulator of the optical system is disposed in a direction substantially perpendicular to the relative motion between the print head and the photosensitive medium. During the relative motion, a series of lines are exposed on the photosensitive medium. In one implementation, a plurality of LEDs are spaced in colored pairs of red, green, and blue, such that each pair of LEDs exposes one color of each line on the photosensitive medium. The spacing between the pairs of LEDs allows the print head to move across the photosensitive medium in a constant relative motion during exposure. In this manner, the optical system delays printing of some color information from each pair of the plurality of LEDs for each line of the image. In another embodiment, each pair of LEDs can print all the lines of the image in turn so as to be a three pass system.

In further aspects, the invention provides methods in accordance with the apparatuses described above. The aforementioned and other aspects of the invention are evident in the drawing and the description that follows.

Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which:

FIG. 5A is a side view of an LED having a covering substance surrounding the LED;

FIG. 5B is a side view of a covering substance surrounding a pair of LEDs and an aperture disposed above the LEDs;

DESCRIPTION OF THE PREFERRED EMBODIMENTS

While the present invention retains utility with a wide variety of optical devices and may be embodied in several different forms, it is advantageously employed with an optical printer. Though the optical printer is the form of the preferred embodiment, and will be described as such, this embodiment should be considered illustrative and not restrictive. A further example of another device in which this invention retains utility is an optical scanning system wherein light is reflected from a subject to form an electronic image of the subject in a computer.

Description of the Preferred Embodiments

Figure 3A:
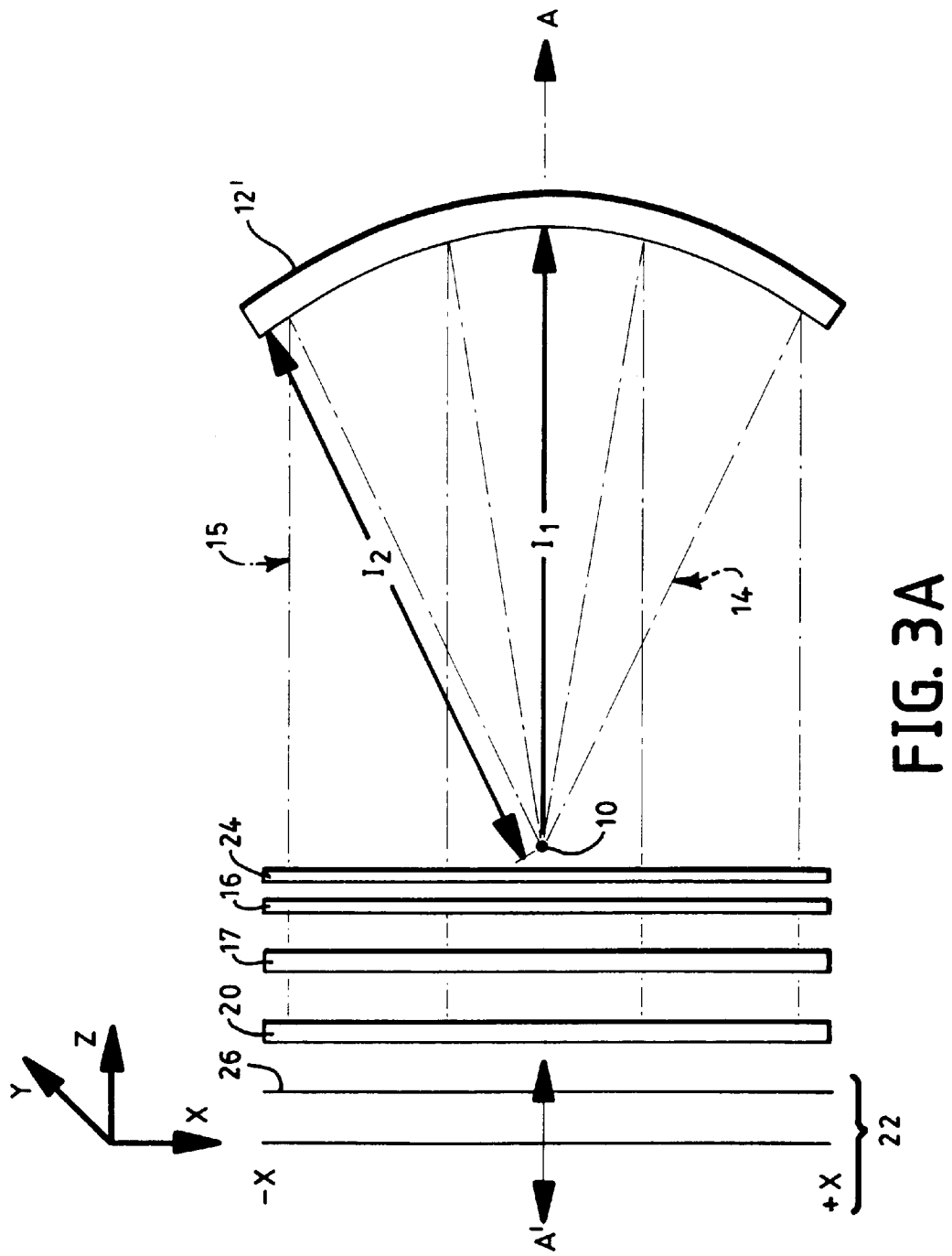
FIG. 3A is a top schematic view of a first embodiment of this invention having an aperture stop.

Referring to FIG. 3A (not drawn to scale), where like numerals denote previously described elements, there is shown an embodiment of the optical system further comprising an aperture stop 24 adapted to alter the illumination distribution of light imaged upon a photosensitive medium 20 at an image plane. The emitted light 14 from the light source 10 is reflected by a concave mirror 12' towards the aperture stop 24. The concave mirror 12' can be a parabolic mirror or a spherical mirror, for example. Portions of the aperture stop 24 define an aperture 32 such that the reflected light 15 passes selectively through the aperture 32 and is imaged on the photosensitive medium 20.

It should be apparent that the photosensitive medium 20 can be any of various substances that will accept the image, such as film, a charge coupled device, a charge injected device, photosensitive drum, or paper, such as in a printer for example.

Similarly, it should be apparent that the light source 10 can be any of various devices. In the preferred embodiment, the light source is a plurality of LEDs, and includes at least one LED for red, green and blue (RGB), respectively. One skilled in the art will realize that the LEDs of this embodiment and those which will be discussed hereinafter can be substituted with any of various other light sources that create colored light such as standard white light sources in conjunction with colored filters.

Figure 3C:
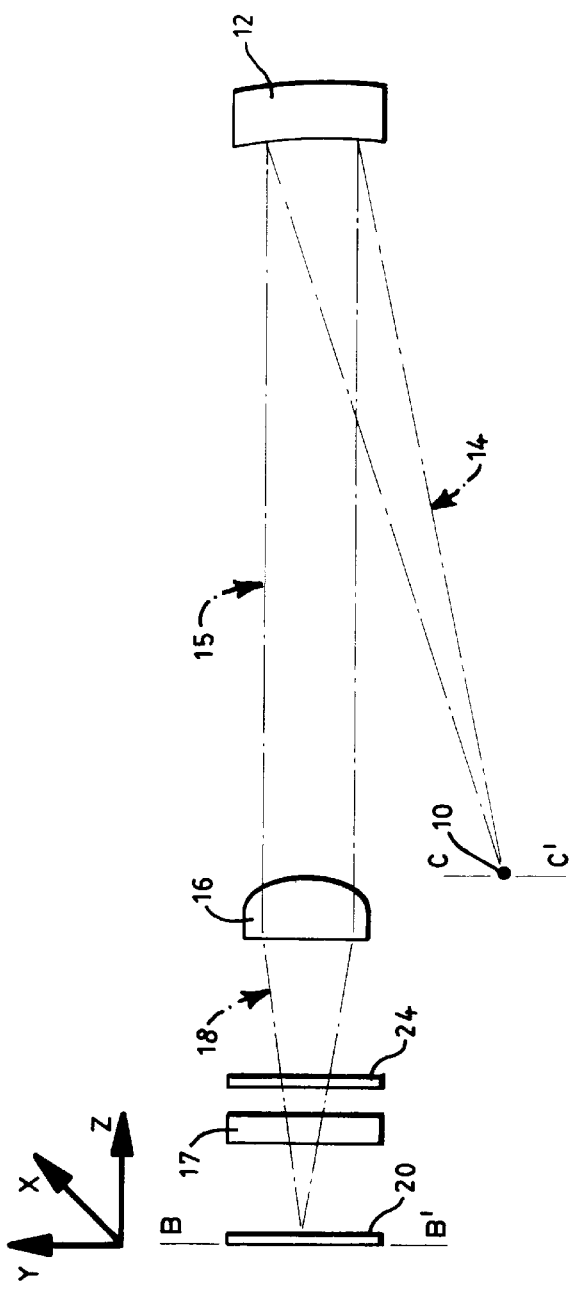
FIG. 3C is a side-view of one embodiment of this invention having an aperture stop in combination with a spatial light modulator.
Figure 3B:
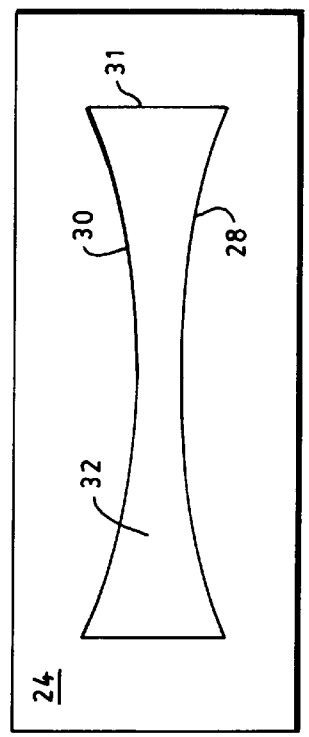
FIG. 3B is a front view of one implementation of the aperture stop of FIG. 3A.

As is shown in FIG. 3B (not drawn to scale), a top view of one implementation of the aperture stop 24 is shown. The aperture 32 is defined by a first curve 28 and a second curve 30 connected at their terminating ends by lines 31 parallel to a "slow-scan" direction of the optical system. In the preferred embodiment, the "slow-scan" direction is along the y axis while a "fast-scan" direction is along the x axis. It should be apparent that this orientation can be changed without departing from the scope of the invention. The term "curve" as used herein is understood to mean any line whether line is straight, curved, or substantially disjointed, for example, or anywhere within this continuum. It should also be apparent that the lines 31 can be eliminated or replaced with other curves without departing from the scope of the invention.

In the preferred embodiment the aperture stop 24 is adapted to selectively allow transmission of a portion of a emitted light 14 while obstructing a remaining portion of the emitted light 14, such that the transmitted light will have a substantially uniform illumination distribution 26 plotted as a function of distance along the x-axis of the photosensitive medium as shown on a graph 22 in FIG. 3A. In the preferred embodiment the aperture stop 24 is designed to normalize the illumination distribution of the reflected light 15 to the lowest light point. Thus, allowing the illumination distribution 26 to be uniform across the photosensitive medium 20 in the "fast-scan" direction.

To normalize the reflected light 15, curves 28 and 30 are defined so as to permit a greater transmission of light at the terminating ends while prohibiting the transmission of a portion of the reflected light 15 near a center of the curves 28, 30. Thus, the aperture stop 24 impedes transmission of light near the central axis A-A' of the optical system, where the illumination is greater due to the aforementioned difference in path lengths and cosine fall-off, while permitting a greater transmission of the reflected light 15 at the extreme points. The resulting illumination is normalized to a lowest point of the illumination distribution at the extreme points.

Figure 1A:
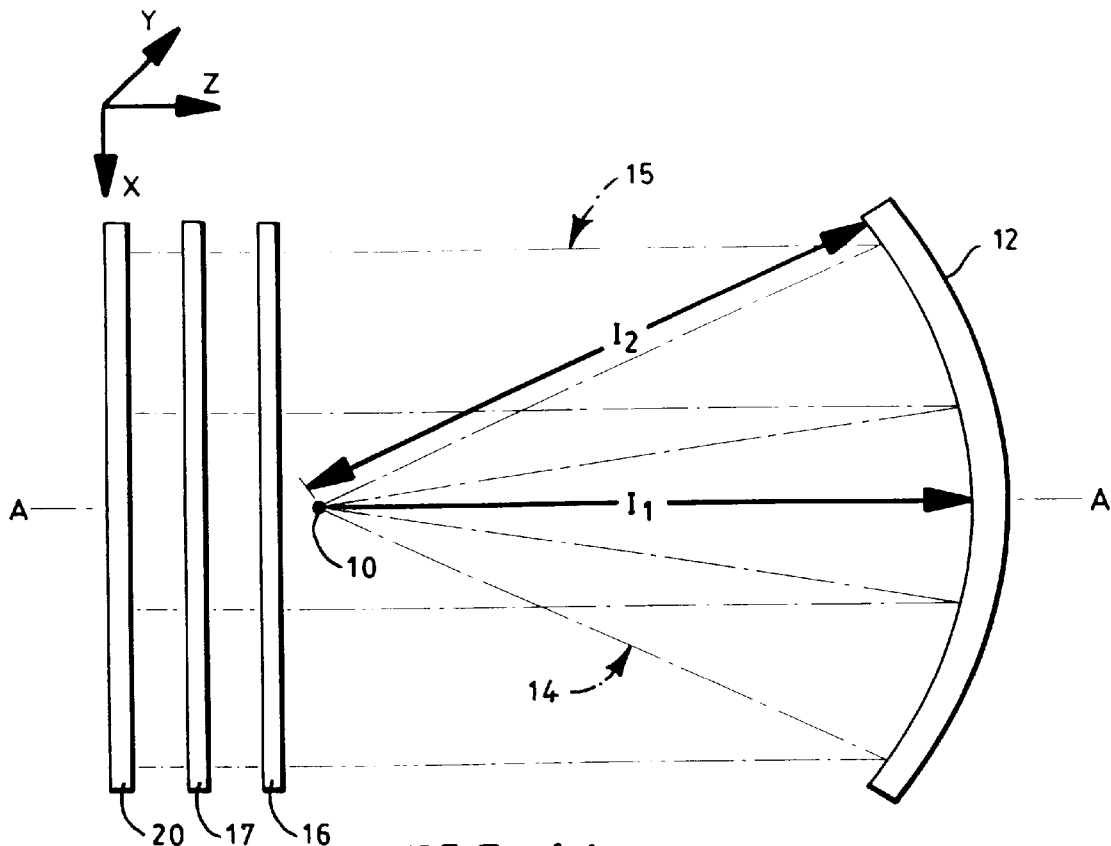
FIG. 1A is a top view of a prior art schematic view of an optical system.
Figure 1B:
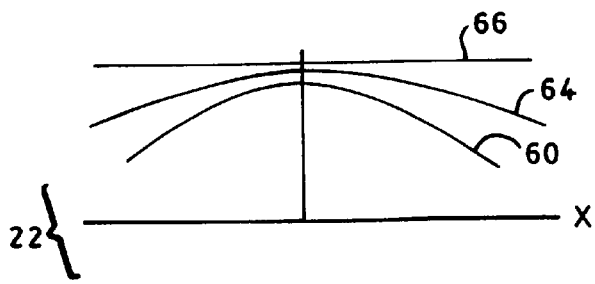
FIG. 1B is a graph of the illumination distribution of the optical system of FIG. 1A.
Figure 1C:
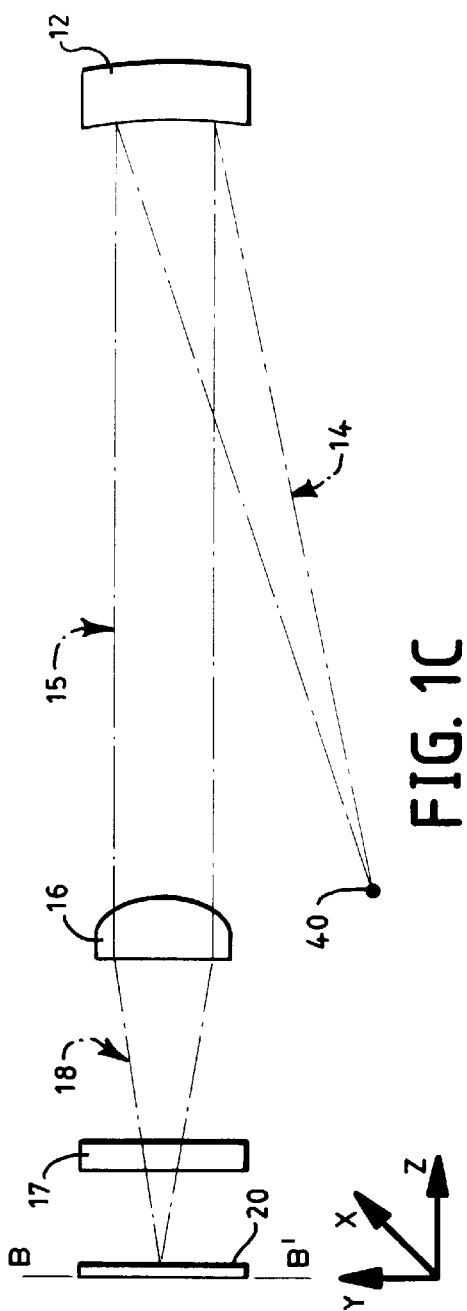
FIG. 1C is a side-view of prior art schematic view of an optical system.
Figure 1D:
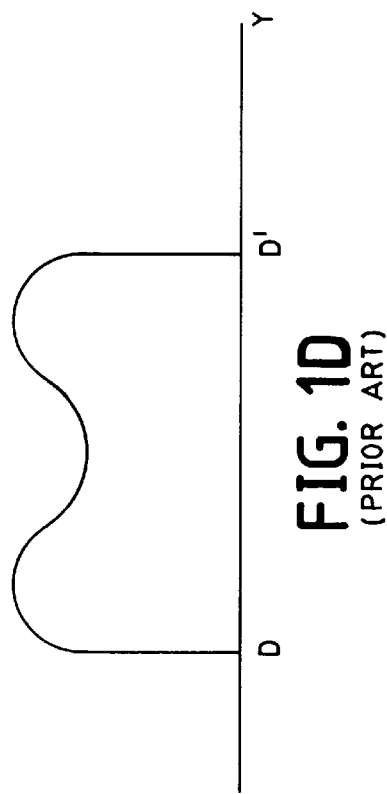
FIG. 1D is a graph of the illumination distribution of the optical system at the imaging plane of FIG. 1C.

In this example, the curves 28, 30 are related, in part, to the light drop-off of FIG. 1B. It should be appreciated that the illustrated curves 28, 30 and thus the aperture 32 can be defined either functionally or intrinsically to produce a uniform illumination distribution 26.

It should also be appreciated that a non-uniform illumination distribution of the light at the image plane can be achieved, as desired, by defining the aperture 32 appropriately. One such use of a non-uniform illumination distribution could be to compensate for reagent spread problems in an instant-type film.

Turning now to FIG. 3C (not drawn to scale), where like numerals designate like elements an embodiment of the optical system is shown. The aperture stop 17' governs the amount of reflected light that is transmitted to the image plane B-B'. The aperture stop 17' may be positioned at any point in the optical system after the light source 10. For example, as is shown in FIG. 3C the aperture stop 17' is positioned after the cylindrical lens 16. The function of an aperture stop and a spatial light modulator can be performed by one element, as more fully described hereinafter, which is depicted in FIG. 3C as aperture stop 17'.

Figure 2A:
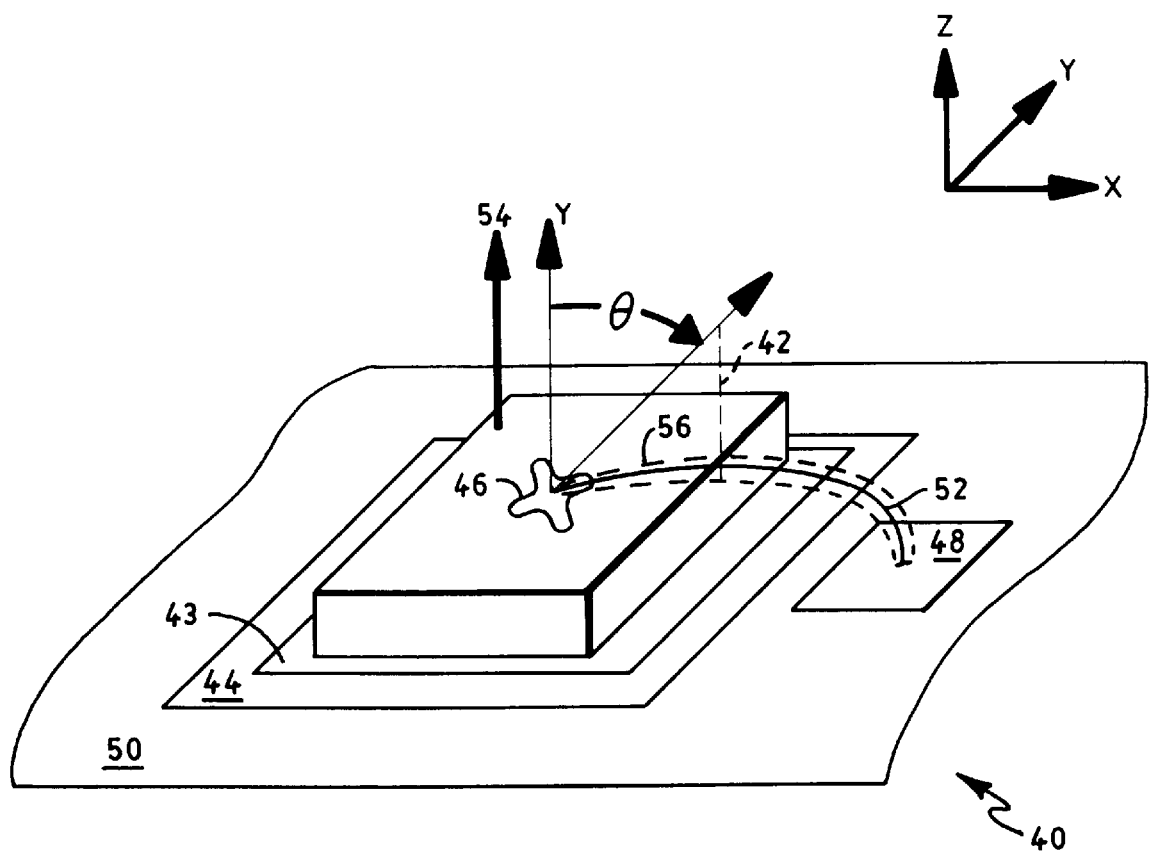
FIG. 2A is perspective view of a prior art LED light source.
Figure 2B:
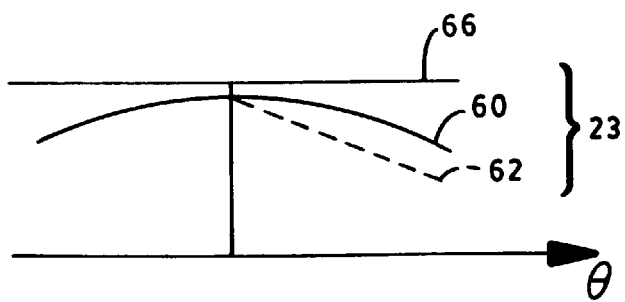
FIG. 2B is a graph of the light emittance of the LED light source of FIG. 2A.

The aperture stop 24 can also correct for inherent asymmetry in the illumination distribution due to any component in the optical system whether prior to, or after the aperture stop 24 that produces a non-uniform illumination distribution on the photosensitive medium 20. For instance, the aperture 32 can be used to compensate for the alteration of the illumination distribution caused by the bonding wire 52 of the standard LED light source 40 as described in connection with FIG. 2A and FIG. 2B. In this implementation, the aperture 32 defined by the distance between the curves 28, 30 would be larger on a same side of the optical system with the bonding wire 52 as compared to an opposing side. In contrast, a second of the curves 28, 30 would be defined either functionally or intrinsically to obstruct the passage of a portion of the reflected light 15 emitted from a side of the LED opposed to bonding wire 52. The transmitted light would then be normalized to the lowest point of light emitted from the LED 42 being the side having the bonding wire 52.

Figure 4A:
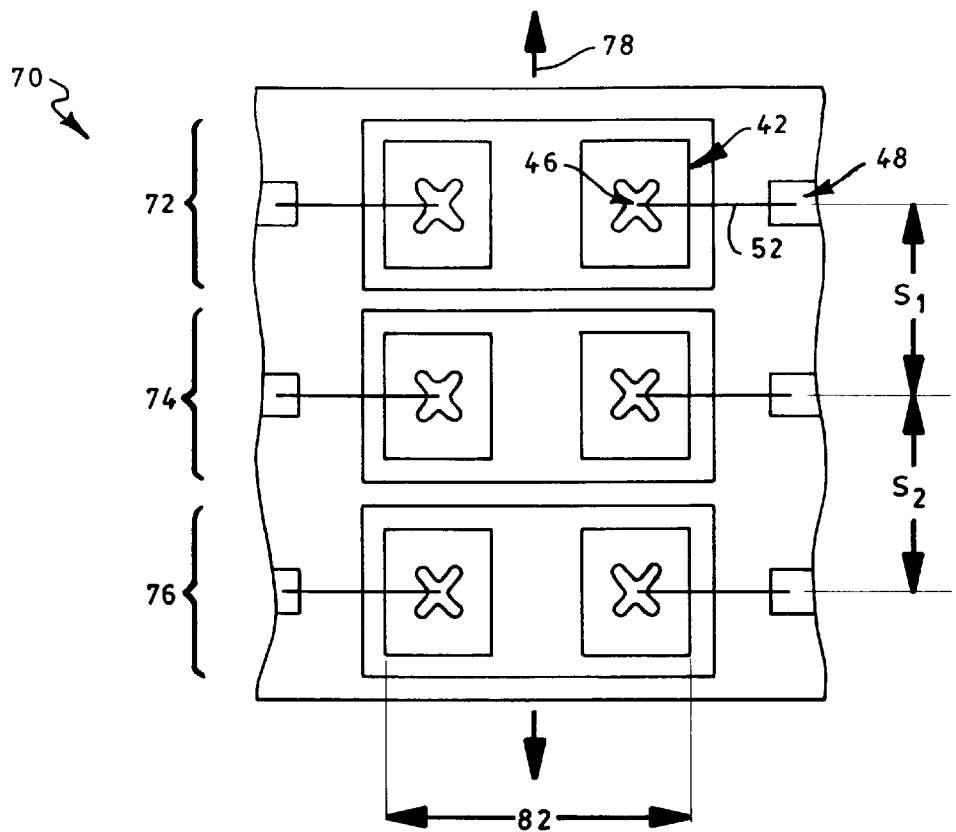
FIG. 4A is a top view of a light source of a second embodiment of this invention.

The asymmetric angular light drop-off due to the bonding wire 52 can also be eliminated by altering the light source 10 as more fully described in FIG. 4A (not drawn to scale), where like numerals designate like elements. FIG. 4A illustrates a symmetrical light source 70 comprising a plurality of LEDs 42 that are disposed in pairs 72, 74, 76 about an axis 78 of the symmetrical light source 70. The light source 70 includes a pair of red LEDs 72 positioned above a pair of green LEDs 74 positioned above a pair of blue LEDs 76. Also, in the preferred embodiment, the axis 78 is perpendicular to the central axis A-A' of the optical system and is coaxial with the y-axis. It should be apparent that the axis 78 can also be tilted toward the mirror 12 or back towards photosensitive medium 20.

The plurality of LEDs 42 are disposed in pairs 72, 74, 76 such that each pair has the bonding wire 52 off-set to an opposed side of the LED pair. Only the element of the LED 42 causing the asymmetrical light drop-off has to be positioned to form a mirror-image circuit disposed about an axis of reflection, where the axis of reflection is the axis 78. In this example, the bonding wire 52 that causes the asymmetrical angular light drop-off. In another implementation the bonding wire of one or more of the LEDs could be positioned at the axis of reflection, and this one or more LED in combination with pairs of LEDs would correct for the asymmetrical angular light drop-off, as more fully shown in FIG. 4B. It should be apparent that any remaining elements of the LEDs 42 do not have to form mirror images about the axis 78 when no correction to the illumination distribution is required.

It should also be apparent that the effect of other elements in a light source that obstruct or alter the emission of emitted light 14 can be similarly minimized by disposing them about the axis 78 or an axis rotated 90° from the axis 78, such as a connector to a circuit board, for example, or an asymmetrically positioned pad 46, for example.

Even with the symmetrical light source 70, any non-uniformities in the passivation layer 56 can distort the illumination distribution. FIG. 5A (not drawn to scale) illustrates an LED 42 surrounded by a cover material 98 in lieu of the passivation layer 56. The cover material 98 performs the function of the passivation layer 56 without distorting the illumination distribution. As such, the cover material 98 is preferably fabricated from a substantially optically transparent material such as, for example, an epoxy. In the preferred embodiment, the cover material 98 is also chosen so as to minimize trapping of the emitted light 54. Accordingly, the cover material 98 preferably has an index of refraction that will promote transmission of the emitted light 54 at the cover material-air interface. The cover material 98 can be added to the light source by dropping a small epoxy layer over the LEDs followed by a thin window and curing the device. It should be apparent that other methods can also be used to add the cover material to the LED.

The cover material 98 protects an LED light source from environmental and industrial hazards such as, inter alia, vibration and condensation. Use of the cover material 98, however, may contribute to stray and scattered emitted light 54, especially if the LED 42 is an edge emitter. FIG. 5B (not drawn to scale) illustrates a light source, where like numerals designate like elements, having an aperture shield 100 to decrease transmission of any stray or scattered light. The aperture shield 100 overlies a portion of the cover material 98 and blocks the transmission of emitted light 55 from forming an image. It should be apparent that the aperture can be smaller or larger to permit the transmission of the emitted light 54 as desired.

Figure 4B:
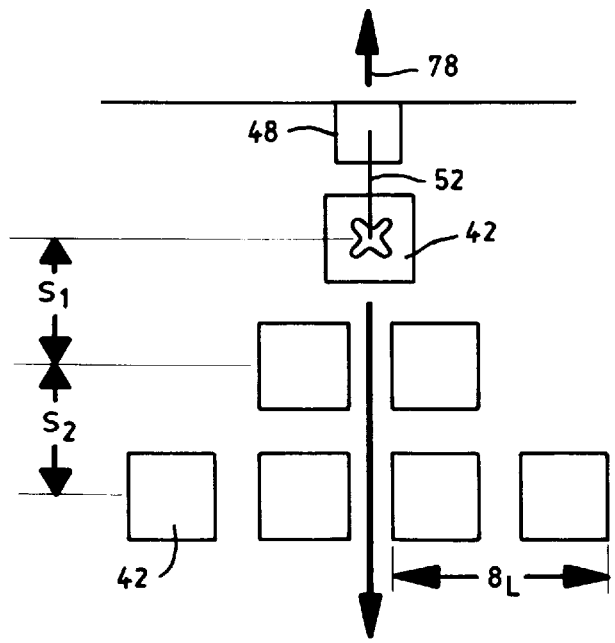
FIG. 4B is a top view of a light source of another embodiment of this invention.
Figure 6A:
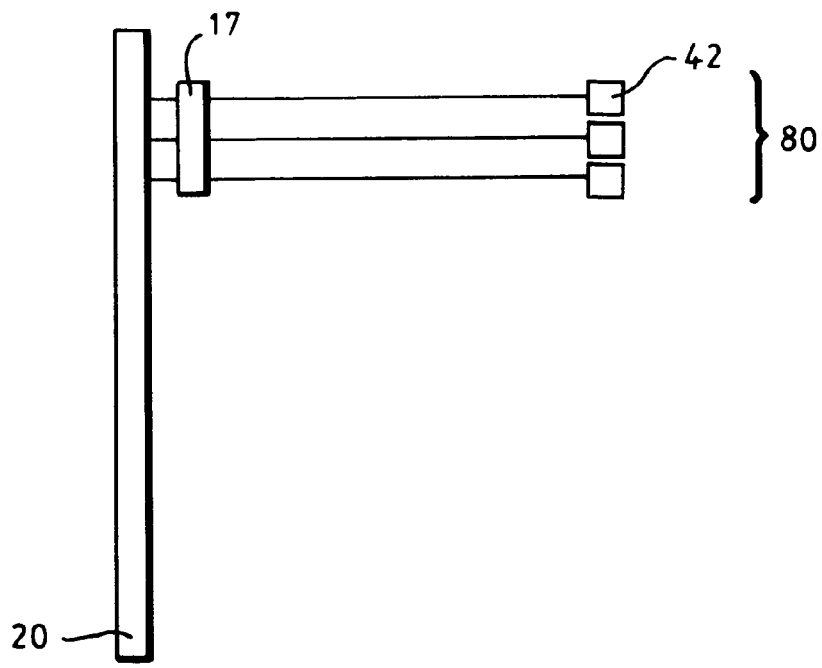
FIG. 6A is a side schematic view of third embodiment of this invention.

Turning now to FIG. 6A (not drawn to scale), with continuing reference to FIGS. 4A and 4B, where like numerals designate like elements, an optical system is shown that includes a light source 80, a spatial light modulator 17 and a photosensitive medium 20.

The spatial light modulator 17 extends to a length across the photosensitive medium 20 in a direction perpendicular to a direction of movement of either the photosensitive medium 20 or the optical system to produce portions of a line at each point of movement of the spatial light modulator 17 relative to the photosensitive medium 20. Thus, there is a two-dimensional scanning of the spatial light modulator 17 across the photosensitive medium 20 in the sense that the photosensitive medium 20 is advancing in a first direction while the spatial light modulator 17 extends across the photosensitive medium 20 in a second direction perpendicular to the first direction.

Each of the LEDs 42, whether there is one or more than one, for each color in turn is illuminated to form a line image on the photosensitive medium 20. The amount of the emitted light 14 that forms the image is determined by the transmission of the spatial light modulator 17.

As shown in FIG. 6C, (not drawn to scale), the spatial light modulator 17 is generally a series of cells 60 disposed in a direction linearly across the photosensitive medium 20. Each cell 60 of the spatial light modulator 17 is an electrically actuatable substance such as a liquid crystal. When an electrical field is placed across an individual cell, the cell transforms between light-transmissive and light-blocking states, or can have multiple defined states there between.

The spatial light modulator 17 performs the modulation of the transmitted light as opposed to the illumination and deillumination of the LEDs. Accordingly, the LEDs 42 could continually fire if the LEDs of each color had a corresponding spatial light modulator 17. In this implementation, each spatial light modulator 17 could modulate the light from one color LED.

It should be apparent that the light source 80 can comprise only one LED of each color or more than one of each color, whether vertically or non-vertically aligned. Further, it should be that symmetry about the axis 78 is nonessential in this embodiment. When the light source contains more than one LED of each color, however, a foot print distance 82 shown on FIGS. 4A and 4B of the same color LEDs must be chosen so as to not affect adversely affect the illumination distribution at the image plane. The foot print distance 82 is chosen as a compromise between two effects. The first effect being if the foot print distance 82 is zero or negligible, a mask 62 between the cells 60 will cast a shadow on the illumination distribution. The second effect is that when the footprint distance 82 is too large the light will pass through the spatial light modulator 17 at an angle, and will image upon the photosensitive medium 20 in an adjacent pixel instead of the proper pixel.

Figure 7A:
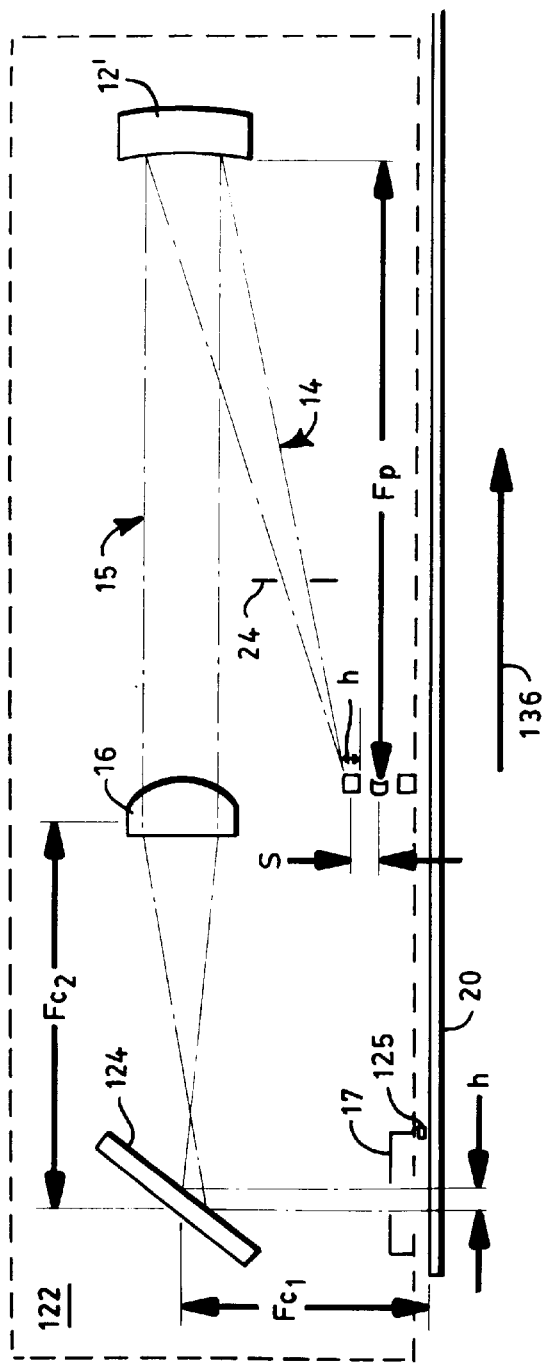
FIG. 7A is a schematic view of a print head having a plurality of LEDs imaging upon a photosensitive medium in accordance with one embodiment of this invention.

Turning now to FIG. 7A (not drawn to scale) which shows an optical system that in contrast to the prior optical systems includes the additional element of a fold mirror 124, an aperture stop 17 and a photodetector 125. The fold mirror 124 alters the direction of the light path. One application of the fold mirror 124 would be to decrease the volume necessary to allow the optical system to image on the photosensitive medium 20. For instance, in one embodiment, a print head 122 remains in relative constant motion with respect to the photosensitive medium 20 during the exposure of the image, where the print head 122 includes the LED light source 70, the cylindrical lens 16, the spatial light modulator 17, concave mirror 12' and the fold mirror 124.

The LED light source 70 projects emitted light 14 off the concave mirror 12' through the cylindrical lens 16 which is focused through the spatial light modulator 17 and then imaged on the photosensitive medium 20. The fold mirror 124 allows the longest dimensions of the print head 122 and the photosensitive medium 20 to be parallel instead of perpendicular. Thus, allowing any imaging to be completed in a more compact space then the optical system that omits the fold mirror 124.

The photodetector 125 is positioned following the spatial light modulator 17. It can be positioned either outside the print head 122 as shown or within the print head 122. The photodetector 125 calibrates the spatial light modulator 17 by measuring the amount of light transmitted through the spatial light modulator 17. For example, each cell can be instructed to fully transmit light prior to printing an image on the photosensitive medium 20. If the amount of light transmitted through the spatial light modulator 17 is less than specification levels, more current can be transmitted to each cell until the photodetector 125 determines that the specification levels are met or that either the spatial light modulator 17 is not functioning or the light source 70 is not functioning. Similarly a photodetector can also be positioned after the light source 70 to calibrate the LEDs and determine if the LEDs are functioning.

Figure 6B:
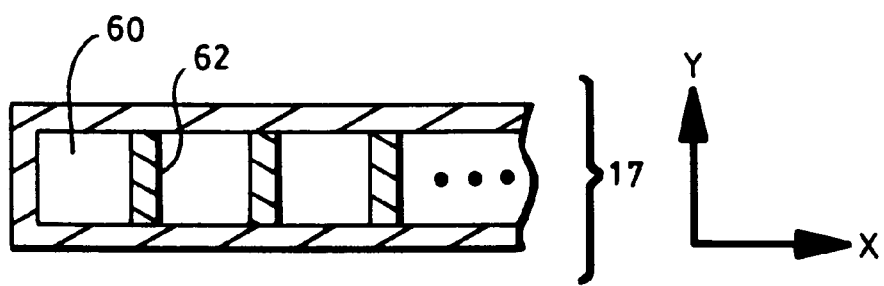
FIG. 6B is a top view of the spatial light modulator of FIG. 6A.
Figure 7B:
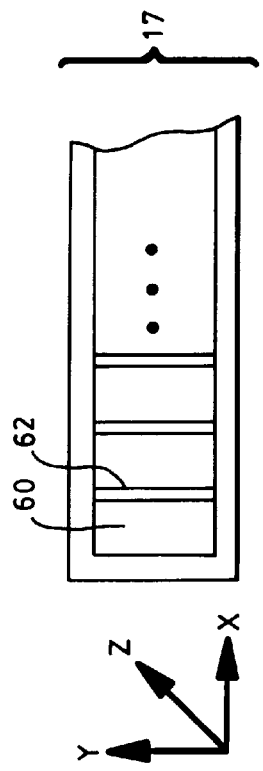
FIG. 7B is a top view of the spatial light modulator of FIG. 7A.

The spatial light modulator 17 is shown on FIG. 7B where like numerals designate like elements. The spatial light modulator 17 is similar to the aperture stop 24 in that the cells 60 of the spatial light modulator 17 are not directly imaged onto the photosensitive medium 20. Light from the light source 70 is substantially collimated in the x-z plane by the concave mirror 12'. The spatial light modulator 17 selectively blocks or unblocks the light which is incident upon it. Because there is no optical element with optical power in the x-direction following the spatial light modulator 17, the pixel size on the photosensitive medium in the x-direction is primarily determined by the x width of a cell at the modulator. As the height of the cells 60 of the spatial light modulator 17 are not imaged onto the photosensitive medium 20 they can be rectangular, square, or any geometrical shape. In order to produce substantially square pixels at the image plane, the embodiment shown in FIGS. 6A and 6B, the height of the cells of the spatial light modulator 17 are indirectly imaged onto the photosensitive medium 20, and accordingly they are shown as squares.

Also similar to the aperture stop, the spatial light modulator 17 can be positioned at any point in the substantially collimated light path of the optical system.

Further, as an aperture stop in an optical system is defined as the element allowing the smallest amount of light to be transmitted, the y-height of a cell of the spatial light modulator can perform both the function of modulating the LEDs and blocking the transmission of the light to the photosensitive medium 20. In such an implementation, a separate aperture stop is unnecessary.

The optical system images the light from each of LEDs 42 of height $h_{led}$ down to a line having a height hi to produce a uniform strip of light. The height $h_l$ of the uniform strip of light is related to the height of the LED 42 $h_{led}$ by a magnification factor, $(F_c/F_p)$, where $F_c$ equals the focal length of the cylindrical lens 16 and is equal to $F_{c1}$ plus $F_{c2}$, and $F_p$ equals the focal length of the concave mirror 12'. Therefore, the height of the LED $h_{led}$ is multiplied by the aforementioned magnification factor to determine the height $h_l$ of the line on the photosensitive medium 20, that is, $$h_l = h_{led} (F_c/F_p).$$

Each line is imaged on photosensitive medium 20 by projecting the red emitted light 14 from the red LEDs 72 through the optical system onto the photosensitive medium 20 followed by the blue LEDs 74 and the green LEDs 76. It should be apparent that the color of the LEDs 42 can be ordered in any manner and correspondingly imaged. The total time it takes to expose one full color line comprised of red, green, or blue is a line time $l_t$, where each color will take substantially at most one-third of that time or ⅓ $l_t$ to be exposed.

During the exposure, the cells of the spatial light modulator 17 will alternate between a light transmissant and a light-blocking state, and will reproduce the image on the photosensitive medium 20 one color at a time, until at least most of the lines have been imaged with all three colors. In the preferred embodiment, each LED is turned on and off substantially instantaneously to make the illumination distribution at the image plane of each colored line rectangular and not trapezoidal. Further, in the preferred embodiment, each LED illuminates and then deilluminates.

Figure 7C:
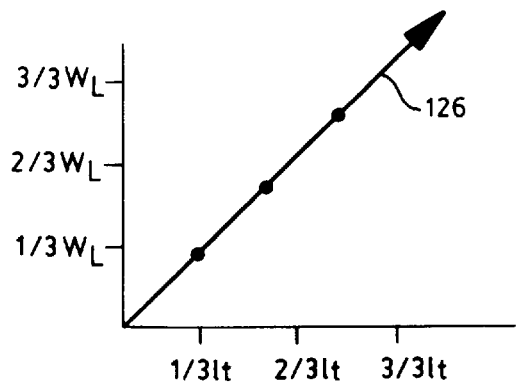
FIG. 7C is a timing diagram illustrating one implementation of the exposure on the photosensitive medium as shown in FIG. 7A.

The movement of the print head 122 during exposure, over time, in the preferred embodiment is shown in FIG. 7C, with continuing reference to FIGS. 4A and FIGS. 4B, where the print head 122 advances one line height, $h_l$, between each line and one-third of the line height, ⅓ $h_l$ while each color line is imaged, as is shown by graph 126. In the preferred embodiment, the relative motion of the print head 122 is from a bottom of photosensitive medium 20 towards a top. Although the print head 122 or the photosensitive medium 20 can be moving, in the preferred embodiment the print head 122 moves in a direction 136 while the photosensitive medium 20 is stationary.

To insure substantially exact registration of the image during the relative motion such that each color is imaged directly over the preceding color of the same line, the LEDs are positioned so that the spacing in the y-direction is equal to S between the center of the row containing the red LEDs 72 and the center of the row containing the green LEDs 74, as well as between the center of the row containing the green LEDs 74 and the center of the row containing the blue LEDs 7. This spacing is given by the equation $$S = (1/C + N) h_{nom}$$

where

S=spacing between the center of the LEDs,

C=the number of colors or rows of LEDs,

N=an integer; and $h_{nom}$=nominal height of the LEDs.

As S is known, the optical system can focus the area source down to a line such that each color will overlay the other colors during the motion of the print head 122. The height of the LEDs, $h_{led}$ and the length of the space S between the LEDs 42 can be combined in any manner so as to have the spacing between the center of one LED 42 and the center of the next LED 42 to equal to S. In practice, each of the colors is overlaid so that the center of one colored line substantially matches the center of the other two colored lines.

In the preferred embodiment, each red line is imaged ideally contiguous to the prior red line to ensure adequate exposure of the red color across the photosensitive medium. In this example the red LED is the smallest height. This is also the reason why $h_{nom}$ in the preferred embodiment is equal to the $h_{led}$ of the red LED. The overlap of the green line, which is the next in size, and then the blue line, which is the largest in size, into more than one line on the photosensitive medium 20 does not appreciably hinder image quality.

Further, the spacing S, between the red LEDs 72 and the green LEDs 74 does not have to equal the spacing between the green LEDs 74 and the blue LEDs 76 as long as each of the spaces are governed by the equation for S. That is, N can be any integer including zero for each S. When N is zero and the LED's are positioned vertically, as has been shown, the LEDs will overlap each other. As such, N can be in part controlled by market constraints.

The equation for S in conjunction with the heights of LEDs available on the market also constrains the order of the colored pairs of LEDs to red, green, blue when disposed vertically along the y-axis. If, however, the optical system used LED pairs to produce cyan, magenta, yellow, and white or other combinations known in the art, the ordering of LED pairs would be modified in accordance with S and the available sizes of the LEDs.

Figure 7D:
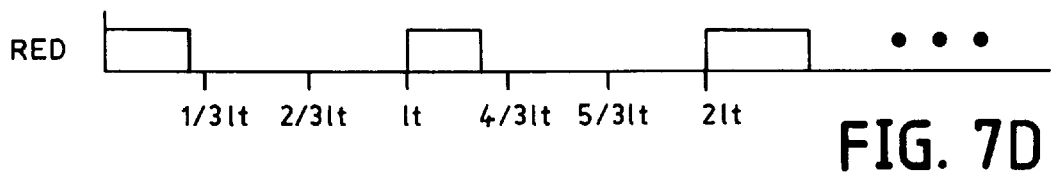
FIG. 7D is a timing diagram illustrating one implementation of the exposure of each color on the photosensitive medium by the print head.
Figure 7E:
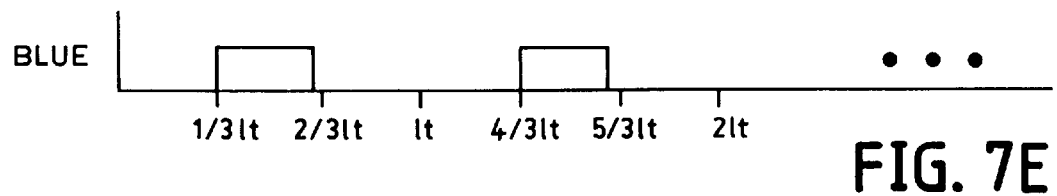
Figure 7F:
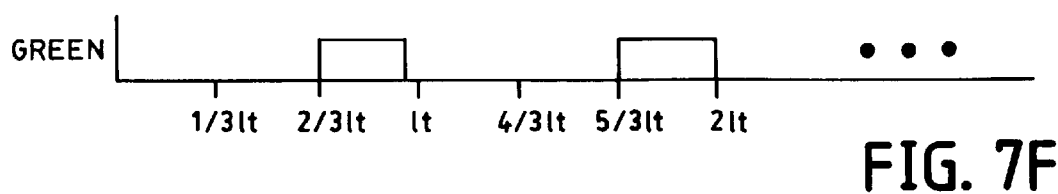

Again, the spacing, S, allows each colored line to be imaged when the LED of that color within the print head 122 is at the same relative position to a line on the photosensitive medium 20. FIG. 7D illustrates that as the print head 122 moves each color is imaged on the photosensitive medium 20 as it comes into position so as to register with the appropriate line. In FIG. 7D, the abscissa denotes time and the graphs 134 represent when a colored line is imaged, or more specifically when the LED of that color is illuminated and the light is transmitted through the spatial light modulator 17 to the photosensitive medium 20.

In this implementation, the red line is imaged from the initial position of the print head 122 at t=0. The red LED will stay illuminated, as described before, up to $\frac{1}{3}$ of the line time. During that $\frac{1}{3}$ of a line time, the print head 122 will move in the direction 136 a distance equal to $\frac{1}{3}$ of the line height or $\frac{1}{3} h_l$, relative to the photosensitive medium as previously described and shown on FIG. 7C.

Simplifying, a red line is imaged at times $t_1 = 0$ through $\frac{1}{3} l_t$ $t_4 = l_t$ through $l_t + \frac{1}{3} l_t$ $t_7 = 2 l_t$ through $(2 l_t + \frac{1}{3} l_t)$ and so on.

The timing diagram illustrates that the red line images line 1 first, the blue line images line 1 second and the green line images line 1 last. This assumes that S is equal between the red LEDs and the green LEDs as well as between the green LEDs and the blue LEDs. More simply, the order of the imaging of line 1, line 2 and line 3 assumes that N is the same for each S. Under this assumption, the timing diagram shows that the blue line is imaged at $t_2 = (\frac{1}{3}) l_t$ through $(\frac{1}{3}) l_t + (\frac{1}{3}) l_t$, $t_5 = (1 + \frac{1}{3}) l_t$ through $(1 + \frac{1}{3}) l_t + (\frac{1}{3}) l_t$ $t_8 = (2 + \frac{1}{3}) l_t$ through $(2 + \frac{1}{3}) l_t + (\frac{1}{3}) l_t$, and so on.

And the green line is imaged at $t_3 = (\frac{2}{3}) l_t$ through $(\frac{2}{3}) l_t + (\frac{1}{3}) l_t$, $t_6 = (1 + \frac{2}{3}) l_t$ through $(1 + \frac{2}{3}) l_t + (\frac{1}{3}) l_t$, $t_9 = (2 + \frac{2}{3}) l_t$ through $(2 + \frac{2}{3}) l_t + (\frac{1}{3}) l_t$, and so on.

In chronological order, the red portion of line 1 will be imaged during the time t=0 to t=$\frac{1}{3} l_t$. At the time t=$\frac{1}{3} l_t$, the red line will not be in the same relative position to line 2 as it was to line 1 at time t=0. As such, the red line will not be imaged during the next $\frac{1}{3} l_t$. As neither the blue line nor the green line is at the same relative position with respect to line 1 as was the red line was at time=0, the blue component of line 1 or the green component of line 1 will also not image on the photosensitve medium during the time period from t=$\frac{1}{3} l_t$ to t=$\frac{2}{3} l_t$. The print head 122, however, will still move the $\frac{1}{3}$ of a line height during the time period from t=$\frac{1}{3} l_t$ to t=$\frac{2}{3} l_t$. The time that the remainder of line 1 is imaged depends on N, as is shown below:

| time | LED illuminated | N = 1 (between all the LEDs) | N = 2 (between all the LEDs) |
|---|---|---|---|
| $t_1$ | Red LED illuminates | Images red portion of line 1 | Images red portion of line 1 |
| $t_2$ | GreenLED illuminates | Images green portion of line 0 | Images green portion of line −1 |
| $t_3$ | Blue LED illuminates | Images blue portion of line −1 | Images blue portion of line −3 |
| $t_4$ | Red LED illuminates | Images red portion of line 2 | Images red portion of line 2 |
| $t_5$ | GreenLED illuminates | Images green portion of line 1 | Images green portion of line 0 |
| $t_6$ | Blue LED illuminates | Images blue portion of line 0 | Images blue portion of line −2 |
| $t_7$ | Red LED illuminates | Images red portion of line 3 | Images red portion of line 3 |
| $t_8$ | GreenLED illuminates | Images green portion of line 2 | Images green portion of line 1 |
| $t_9$ | Blue LED illuminates | Images blue portion of line 1 | Images blue portion of line −1 |
| $t_{10}$ | Red LED illuminates | Images red portion of line 4 | Images red portion of line 4 |
| $t_{11}$ | Green LED illuminates | Images green portion of line 3 | Images green portion of line 2 |
| $t_{12}$ | Blue LED illuminates | Images blue portion of line 2 | Images blue portion of line 0 |
| $t_{13}$ | Red LED illuminates | Images red portion of line 5 | Images red portion of line 5 |
| $t_{14}$ | GreenLED illuminates | Images green portion of line 4 | Images green portion of line 3 |
| $t_{15}$ | Blue LED illuminates | Images blue portion of line 3 | Images blue portion of line 1 |

When N=1, the green LED will image an additional green line at the bottom of the photograph called line 0 at time t=2, it will also image an additional green line at the top of the photograph. Similarly the blue LED will image two additional blue lines at the bottom of the photograph, and the red LED will image two additional red lines at the top of the photograph. None of these additional lines will be imaged with all three colors. It is possible to alter the programming of firing the LEDs to omit these unfinished lines, however, if this is not done as the lines fall outside the photosensitive medium, the extra lines are not printed.

In the preferred embodiment, a reproduced image will be printed in this manner, where some of the colors of each line will be imaged in a non-consecutive order. It also should be apparent that during the one-third of a line time, none of the LEDs have to be imaging a portion of a line. It should be apparent that the same relative position, for example, may also be from the top of each LED if the colored lines are to be imaged so that the top sides of each colored line image will match.

In addition, it should be apparent that the same optical system could be used to image in 3 passes, instead of 1. Thereby, all of the red information will be printed while maintaining the relative motion between the print head 122 and the photosensitive medium 20, and then the blue and thereafter the green.

The invention may be embodied in other specific forms without departing from the spirit or essential characteristics thereof. The present embodiments are, therefore, to be considered in all respects as illustrated and not restrictive, the scope of the invention being indicated by the appended claims, rather than by the foregoing description, and all changes which come within the meaning and range of equivalency as the claims are therefore intended to be embraced therein. While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. An optical system for transferring an image onto a medium having an imaging area, the optical system comprising:

a lens system in optical communication with the medium;

a light source comprising a plurality of light emitting diodes in optical communication with the lens system wherein at least three of a plurality of light emitting diodes emit different colored light, a number C of different colors being known, a one of the at least three of the plurality of light emitting diodes having a nominal height $h_{nom}$, measured in a direction of a central axis of the light source, centers of the at least three of the plurality of light emitting diodes being positioned from one another at a distance S, in the direction of the central axis, so that an imaged line can move in constant relative motion with respect to the medium while reproducing the image upon the medium whereby the distance S is determined from the equation $S=h_{nom}(N+1/C)$, where N is an integer; and a spatial light modulator in optical communication with the light source extending across the imaging area of the medium in a direction perpendicular to a direction of movement during imaging.

2. An optical system according to claim 1 wherein the light source includes at least one colored pair of light-emitting diodes disposed about the central axis.

3. An optical system according to claim 1 wherein the light source produces a symmetrical angular illumination distribution.

4. An optical system according to claim 1 wherein the light source has an inherent illumination distribution, the optical system further comprising an aperture stop interposed between the light source and the medium having portions defining an aperture, at least one portion being a curve related to the inherent illumination distribution such that the radiation after the aperture has a pre-selected illumination distribution.

5. An optical system according to claim 4 wherein the optical system produces a substantially uniform illumination distribution at the medium.

6. An optical system according to claim 1 further comprising:

a covering material surrounding a portion of the light source, fabricated of an optically transparent material protecting the light source and decreasing detrimental environmental hazardous to electrical communication between the light source and the power source; and an aperture shield disposed over the cover material to impede transmission of an unwanted portion of the light to the lens system.

7. An optical system according to claim 1 wherein a smallest of the at least three of the plurality of light emitting diodes has the nominal height.

8. An optical system according to claim 1 wherein the distance S between each row of the light emitting diodes varies.

9. An optical system according to claim 1 wherein the spatial light modulator further comprises a series of cells independently controllable extending across the spatial light modulator, the cells having a geometrical shape where the height of the cells is substantially independent of a shape of pixels imaged upon the medium.

10. An optical system according to claim 9 wherein the geometrical shape is rectangular.

11. An optical system according to claim 1 wherein the spatial light modulator selectively blocks transmission of the light as an aperture stop.

12. An optical system according to claim 1 wherein the spatial light modulator can be positioned at any point in the optical system after the light source.

13. An optical system according to claim 1 wherein each of the more than one light emitting diodes further comprises a contact, the contact of each pair being offset to an opposed such that the radiation illumination distribution of the pair is symmetrical for each pair of the plurality of light-emitting diodes.

14. An optical system according to claim 1 wherein the light-emitting diodes forms a mirror-image circuit having an axis of reflection disposed between two mirror images.

15. An optical system according to claim 1 further comprising a photodetector following the spatial light modulator to calibrate the spatial light modulator.

16. An optical system according to claim 1 further comprising a photodetector positioned after the light source to calibrate the light source.

17. An optical system according to claim 4 wherein the aperture stop further comprises at least one second portion opposed to the curved portion such that the second side and the curved portion define an aperture there between which approximates an inverse of a portion of the illumination distribution.

18. A system according to claim 17 wherein the preselected distribution is uniform.

* * * * *